(12) United States Patent
Serbe

(10) Patent No.: US 6,704,375 B1
(45) Date of Patent: Mar. 9, 2004

(54) DEVICE FOR THE HOMODYNE RECEPTION OF OPTICALLY PHASE-KEYED SIGNALS

(75) Inventor: Christoph Peter Serbe, Huettlingen (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/363,301

(22) Filed: Jul. 28, 1999

(30) Foreign Application Priority Data

Oct. 22, 1998 (CH) ............................................. 2130/98

(51) Int. Cl.$^7$ ................................................. H03D 3/22
(52) U.S. Cl. ........................................ 375/329; 398/187
(58) Field of Search ................................ 375/215, 214, 375/294, 296, 316, 373, 371, 376, 327, 329; 359/189, 326, 190, 192, 191, 193, 194; 455/214, 234.1, 314, 324, 130; 331/30, 22, 31; 324/76.41

(56) References Cited

U.S. PATENT DOCUMENTS

| | | | |
|---|---|---|---|
| 4,037,171 A | | 7/1977 | Cordell |
| 4,423,390 A | | 12/1983 | Waters |
| 5,007,106 A | | 4/1991 | Kahn et al. |
| 5,247,382 A | * | 9/1993 | Suzuki ........................ 359/156 |
| 5,323,258 A | * | 6/1994 | Tsushima et al. ............ 359/190 |
| 5,359,613 A | * | 10/1994 | Mols et al. .................... 372/20 |
| 5,396,361 A | * | 3/1995 | Sasaki et al. ................ 359/124 |
| 5,422,752 A | * | 6/1995 | Hardcastle .................. 359/183 |
| 5,471,660 A | * | 11/1995 | Masaki ..................... 455/161.2 |
| 5,510,922 A | * | 4/1996 | Naito .......................... 359/124 |
| 5,510,927 A | * | 4/1996 | Noe ............................ 359/191 |
| 5,568,305 A | * | 10/1996 | Naito et al. .................. 329/315 |
| 5,572,351 A | * | 11/1996 | Hadjifotiou .................. 359/161 |
| 5,657,307 A | * | 8/1997 | Taneya et al. ............... 369/116 |
| 5,687,261 A | * | 11/1997 | Logan ......................... 359/189 |
| 5,887,247 A | * | 3/1999 | Baltus et al. ............. 455/277.2 |
| 6,008,931 A | * | 12/1999 | von Helmolt et al. ....... 359/326 |

FOREIGN PATENT DOCUMENTS

| | | |
|---|---|---|
| DE | 4110138 | 3/1992 |
| EP | 535494 | 4/1993 |

OTHER PUBLICATIONS

Barry et al., *Carrier Synchronization for Homodyne and Heterodyne Detection of Optical Quadriphase–Shift Keying*, Journal of Lightwave Technology, vol. 10, No. 12, pp. 1939–1951, (1992).

\* cited by examiner

*Primary Examiner*—Emmanuel Bayard
(74) *Attorney, Agent, or Firm*—William Michael Hynes; Townsend and Townsend and Crew LLP

(57) ABSTRACT

The device for the homodyne reception of optical phase-keyed signals comprises a heterodyne receiver (101, 102), a data discriminator (20), a frequency acquisition circuit (80) and a local oscillator laser (70). In addition, the device has a window discriminator circuit consisting of a window comparator (30) and a feedback unit (40), whose output is connected with the input of a reversing switch (50). The window comparator (30) has been inserted between the output of the heterodyne receiver (101, 102) and the one input of the feedback unit (40), whose other input is supplied with the output signal (Si) of the discriminator (20). The output of the frequency acquisition circuit (80) is connected with the other connector of the reversing switch (50), whose output signals supplied to the control input of the local oscillator laser (70). The window comparator (30) has two or more thresholds. The feedback unit (40) can have a control input for a quadrature channel (Sq). Use of the window comparator (30) permits the determination of the phase of the optical carrier signal, and therefore the phase regulation of the local oscillator laser (70).

6 Claims, 7 Drawing Sheets

DEVICE FOR THE HOMODYNE RECEPTION OF OPTICALLY PHASE-KEYED SIGNALS

FIELD OF THE INVENTION

The invention relates to a device for the homodyne reception of optically phase-keyed signals, having a heterodyne receiver, a data discriminator, a frequency acquisition circuit and a local oscillator laser.

BACKGROUND OF THE INVENTION

Various modulating methods for digital signal systems, which operate by phase-keying, are known in telecommunications technology, wherein the carrier recovery required for demodulation can take place, for example, by multiplication, remodulation or with the aid of a Costa control loop. When using such or similar systems in connection with optical systems, the problem of phase regulation of a local laser source often arises, which is relatively expensive.

OBJECT AND SUMMARY OF THE INVENTION

It is therefore the object of the invention to create a device for the homodyne reception of optically phase-keyed signals which leads to a simpler phase regulation of the local laser source.

The invention will be explained in greater detail below by means of the drawings.

DETAILED DESCRIPTION OF THE PREFERRED EMBODIMENTS

Figure 1:
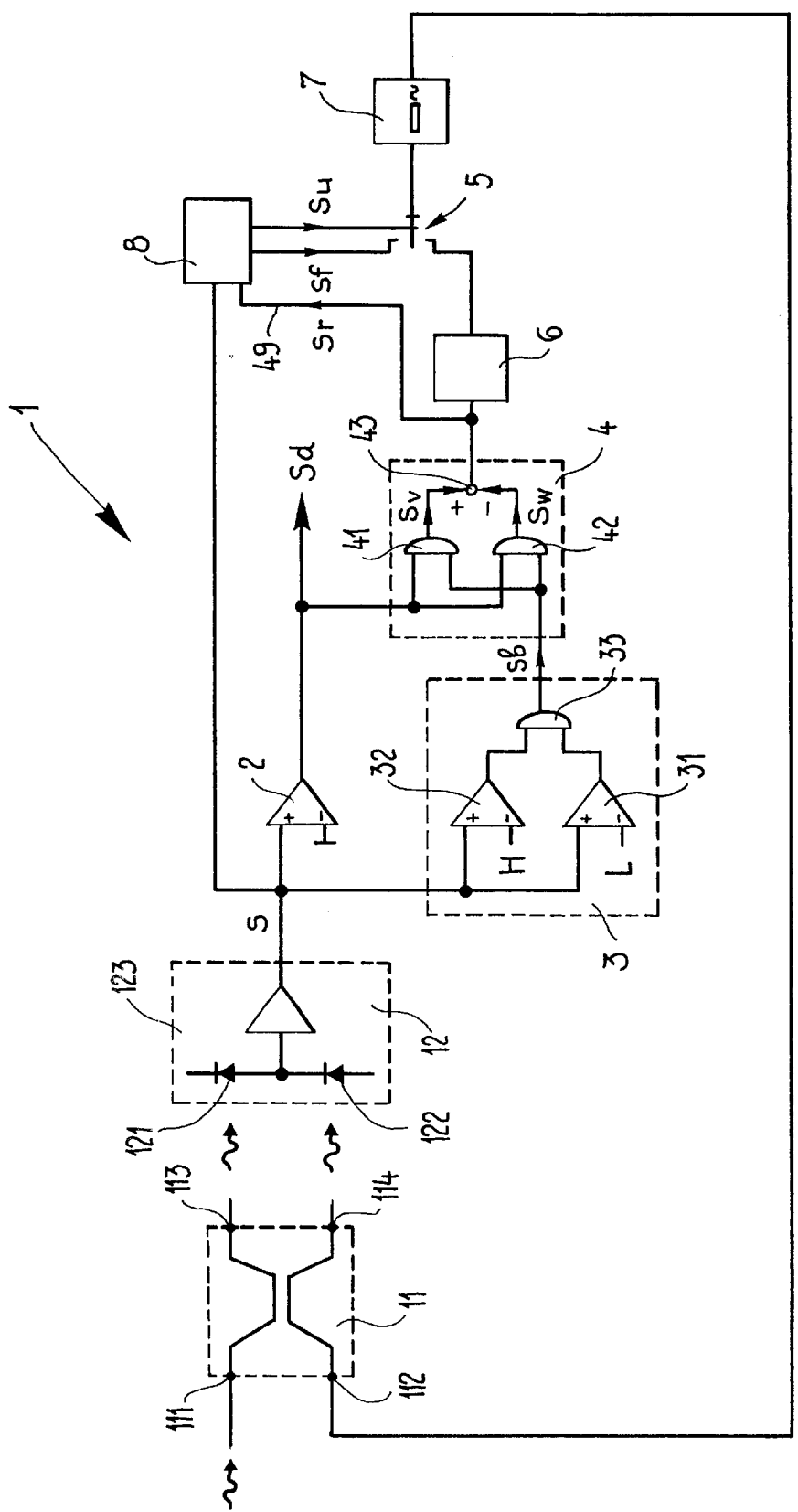
FIG. 1 is a block circuit diagram of an in-phase receiver in accordance with the invention.

The device in accordance with the invention in FIG. 1 comprises a heterodyne receiver 1, consisting of an optical coupler 11, also called a hybrid, and an electro-optical converter 12, also called a compensation circuit, as well as a data discriminator 2, a window comparator 3, also called window discriminator, and a feedback unit 4, whose output is connected with the control input of a local oscillator laser 7 via a reversing switch 5 connected downstream of a filter 6. The inputs of the discriminator 2, supplying the data signal Sd, and of the comparator 3 are connected with the output of the heterodyne receiver, or respectively the electro-optical converter 12. The input of the unit 4 is supplied on the one hand with the data signals Sd provided by the discriminator 2, and on the other hand with the output signal Sb of the comparator 3.

The optical coupler 11 of the miniaturized heterodyne receiver has an input 111 for a received light beam of the frequency fe, and an input 112 for a laser beam of the frequency fq provided by the laser source 7. Of the two outputs of the coupler 11, the one output 113 provides an optical sum signal, and the other output 114 an optical difference signal. These two optical signals respectively act on light-sensitive diodes 121, or respectively 122, which convert them into corresponding electrical signals, which are added in an amplifier 123, which is located in the circuit 12 and whose output provides the analog data signal S. The discriminator 2 is a zero-crossing comparator acting as a simple regenerator, which delivers the digital, i.e. rectangular, data signals Sd.

The window comparator 3 comprises two comparators 31, 32, whose signal inputs are both supplied with the output signal S of the electro-optical converter 12, wherein the output signal of the comparator 32 is linked with the higher threshold value H, and the inverted output signal of the comparator 31 is linked with the lower threshold value L from an AND gate 33.

The feedback unit 4 comprises two AND gates 41, 42, both of which have an input which is connected with the output of the window comparator 3. The other input of the AND gate 41 is provided with the digital data signal Sd, and the other input of the AND gate 42 is provided with the inverted data signal Sd. The outputs of the AND gates 41 and 42 are connected with a respective input of a differential amplifier 43, whose output is connected via the filter 6 and the reversing switch 5 with the control input of the local oscillator laser 7. The loop filter 6 can be a low bandpass filter.

The device moreover comprises a frequency acquisition circuit 8 inserted between the output of the electro-optical converter 12 and the other input of the reversing switch 5, and which in addition is designed to control the reversing switch 5. The following truth table applies for the window comparator 3 in accordance with FIG. 1:

| S   | Sd | H | L | Sb | Sv | Sw |
|-----|----|----|----|----|----|----|
| −1  | 0  | 0 | 0 | 0  | 0  | 0  |
| 0−  | 0  | 0 | 1 | 1  | 0  | 1  |
| 0+  | 1  | 0 | 1 | 1  | 1  | 0  |
| +1  | 1  | 1 | 1 | 0  | 0  | 0  |

In this truth table, S is the analog signal provided by the electro-optical converter 12, Sd the data signal obtained from the discriminator 2, H and L are the threshold value signals of the comparator 3, Sb is a synchronization bit provided by the comparator 3, and Sv and Sw the output signals of the gates 41, or respectively 42. However, the demodulated data signal contains noise, phase errors and other interferences.

Figure 2:
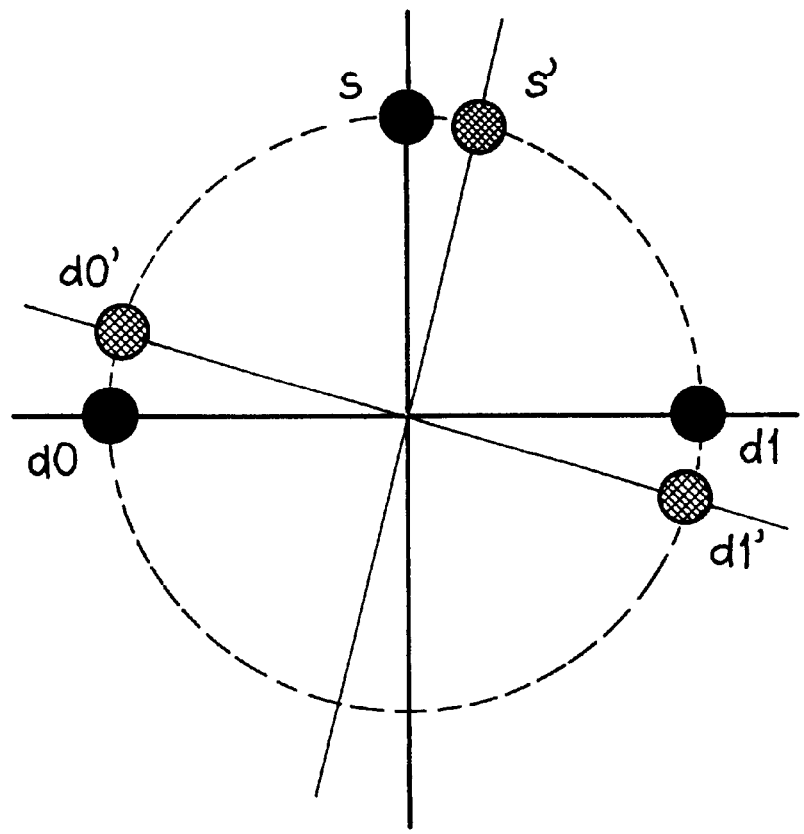
FIG. 2 is a state diagram of the carrier phases and the voltage of the received signals in an in-phase receiver.
Figure 2:
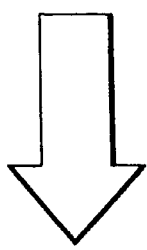
Figure 2:
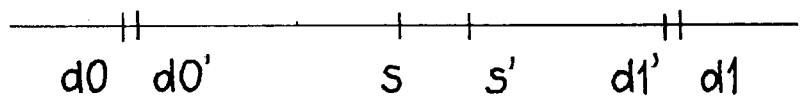

In the phase circuit in accordance with FIG. 2, the reference axes relate to a data transmission without phase errors, wherein the points d0 and d1 in the real axis represent signals with a phase shift of ±90, for which no evaluation of the carrier phase takes place. The point S on the imaginary axis, however, corresponds to a signal with a phase shift of 0 degrees, with which an evaluation of the carrier phase is possible.

Points d0', d1' and S' are also represented in the phase circuit in accordance with FIG. 2, which relate to a data transmission with a phase error, wherein the points d0' and d1' represent signals with a phase shift of 180 degrees, for which no evaluation of the carrier phase takes place. However, the point S in the vicinity of the point S' corresponds to a signal with an expected phase shift of approximately 0 degrees, with which an evaluation of the carrier phase is possible.

Figure 3:
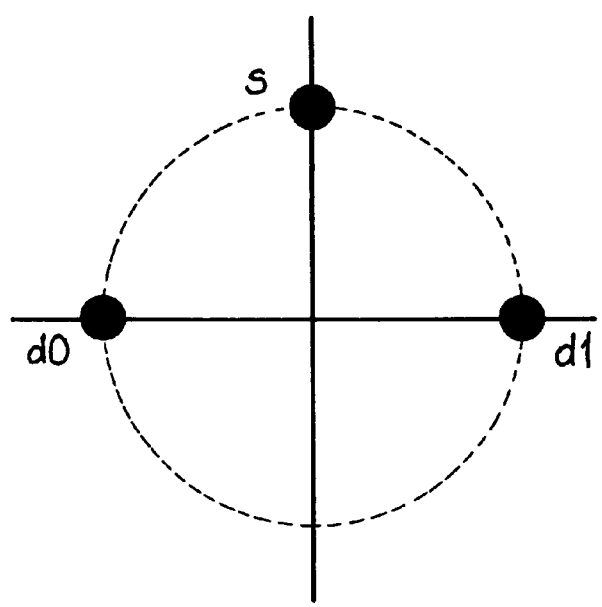
FIG. 3 is a schematic representation of an example of a signal in such a case.
Figure 3:
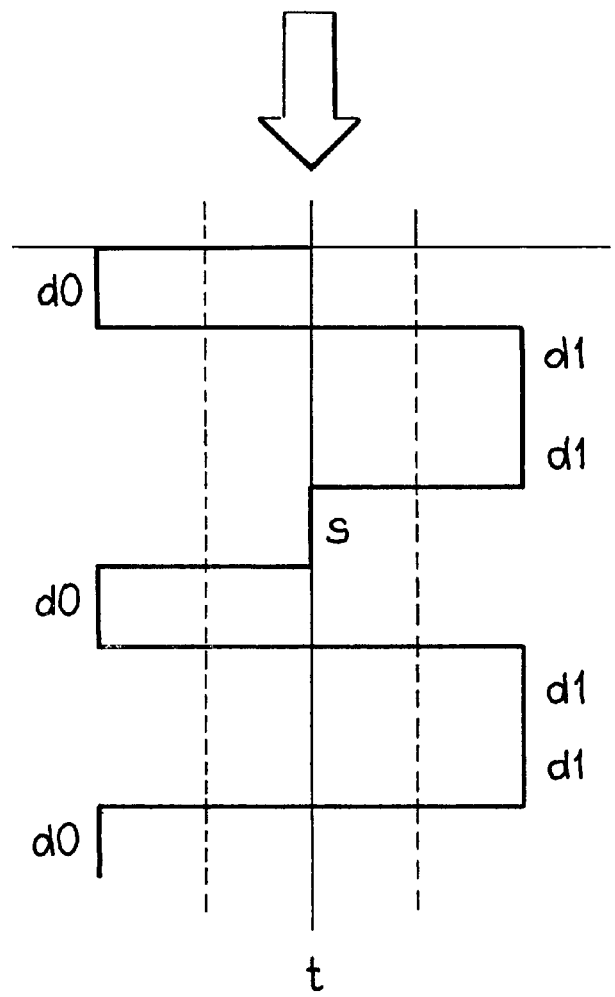

The corresponding voltages of the signals d0, d0', S, S', d1' and d1 are shown at the bottom of FIG. 2, and on the left in FIG. 3 the lower or inferior threshold voltage L (FIG. 1), and on the right the upper or higher threshold voltage H (FIG. 1) of the window discriminator 3 are shown by means of dotted straight lines. The received voltage is positive with >0 and negative with <0. It is possible by means of this to perform a regulation of the phase to 0.

Figure 4:
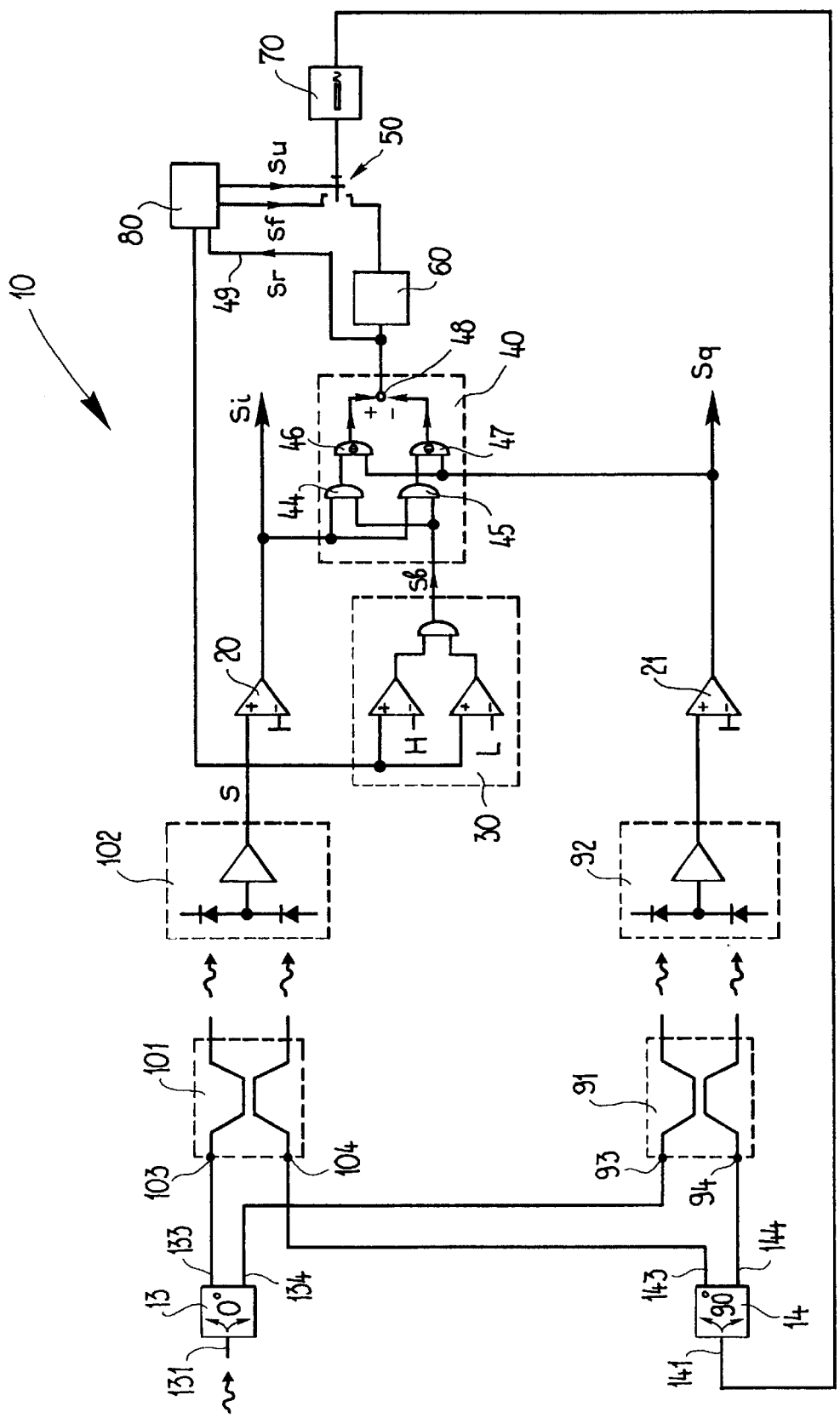
FIG. 4 is a block circuit diagram of a combined in-phase and quadrature receiver in accordance with the invention.

The device 9 of the invention in accordance with FIG. 4 comprises an in-phase heterodyne receiver 10, a data discriminator 20, a window comparator 30 and a controlled feedback unit 40, whose output is connected to the control input of a local oscillator laser 70 via a reversing switch 50 with an upstream-connected filter 60. Here, this heterodyne receiver comprises an optical coupler 101 with a downstream-connected electro-optical converter 102. The inputs of the discriminator 20 supplying the in-phase data signals Si and the window comparator 30 are connected to the output of an electro-optical converter 102. The input of the controlled feedback unit 40 is provided on the one hand with the digital data signal Si supplied by the discriminator 20, and on the other hand with the output signal of the comparator 30.

The device 10 in accordance with FIG. 4 additionally has two optical beam splitters 13 and 14 with respectively an input 131 for the light to be received, or respectively an input 141 for the light of the local oscillator laser 70, as well as a quadrature heterodyne receiver with a downstream-connected data discriminator 21. This quadrature heterodyne receiver also comprises an optical coupler 91 and an electro-optical converter 92, which can be constructed the same as or similar to the elements 101, or respectively 102, in FIG. 4, or the elements 11, or respectively 12, in FIG. 1. The data discriminators 20 and 21 in FIG. 4 can also be constructed the same as the discriminator 2 in FIG. 1. This is correspondingly true for the elements 30, 50, 60, 70 and 80 in FIG. 4, which are per se the same as the elements 3, 5, 6, 7, or respectively 8 in FIG. 1, and can be connected with each other in the same way.

The optical couplers 91 and 101 of this miniaturized heterodyne receiver, known per se, have respectively two inputs 93 and 94, or respectively 103 and 104. The optical beam splitters 13 and 14 each have two outputs 133, 134, or respectively 143, 144, wherein the outputs 133 and 143 are connected with the inputs 103, or respectively 104 of the coupler 101 of the in-phase channel, and the outputs 134 and 144 are connected with the inputs 93, or respectively 94, of the coupler 91 of the quadrature channel. The discriminator 21 also is a simple regenerator, which acts as a zero-crossing comparator. It provides digital data signals, namely the data signals Sq of the quadrature channel which, in accordance with the invention, are additionally supplied to the control input of the controlled feedback unit 40.

The feedback unit 40 comprises two AND gates 44, 45, both of which have an input which is connected with the output of the window comparator 30. The other input of the AND gate 44 is provided with the digital data signal Si, and the other input of the AND gate 45 is provided with the inverted data signal Si. The outputs of the. AND gates 44 and 45 are connected with a respective input of a modulo-2-adder 46, or respectively 47, each of which has a second inverting input, which together are connected with the output of the discriminator 21. The outputs of the adder 46 and 47 are connected with a respective input of a differential amplifier 48, whose output is connected via the filter 60 and the reversing switch 50 with the control input of the local oscillator laser 70. The filter 60 is the loop filter of the optical phase-locked loop ("OPLL") and can be realized, for example, as a low bandpass filter. The radiation supplied by the laser source 70 is conducted to the input 141 of the quadrature beam splitter 14.

Moreover, the device in accordance with FIG. 4 comprises a frequency acquisition circuit 80, which is inserted between the output of the electro-optical converter 102 and the other input of the reversing switch 50 and additionally controls the reversing switch 50.

The circuits 101, 102, 20 and 30 in accordance with FIG. 4 operate in the same way as the corresponding elements 11, 12, 2 and 3 in accordance with FIG. 1.

Figure 5:
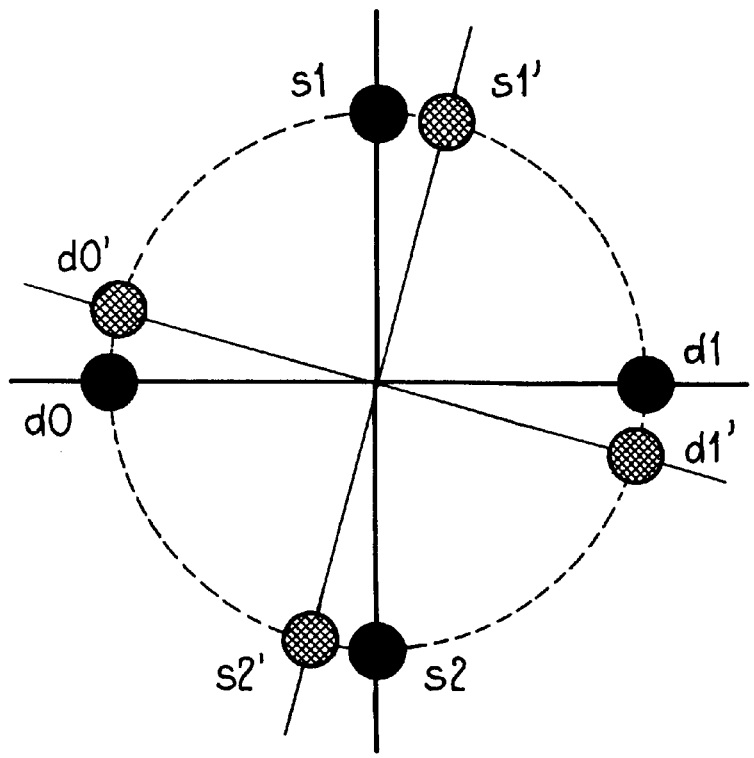
FIG. 5 is a state diagram of the carrier phases and the voltage of the received signals in an in-phase and a quadrature receiver.
Figure 5:
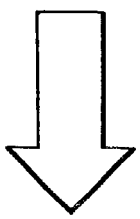
Figure 5:
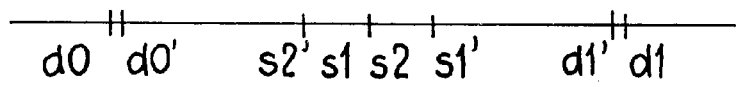

In the phase circuit in accordance with FIG. 5, the reference axes relate to a data transmission without phase error, wherein the points d0 and d1 in the real axis represent signals with a phase shift of ±90 degrees, which no evaluation of the carrier phase takes place. The points S1 and S2 on the imaginary axis however correspond to a signal with a phase shift of 0 degrees, or respectively 180 degrees, with which an evaluation of the carrier phase is possible.

Points d0', d1' and S1', S2' are also represented in the phase circuit in accordance with FIG. 5, which relate to a data transmission with a phase error, wherein the points d0' and d1' represent signals with a phase shift of ±90 degrees, for which no evaluation of the carrier phase takes place. However, the points S1' and S2' in the vicinity of the points S1, or respectively S2, correspond to a signal with a phase shift of 0 degrees, respectively 180 degrees, with which an evaluation of the carrier phase is possible.

Figure 6:
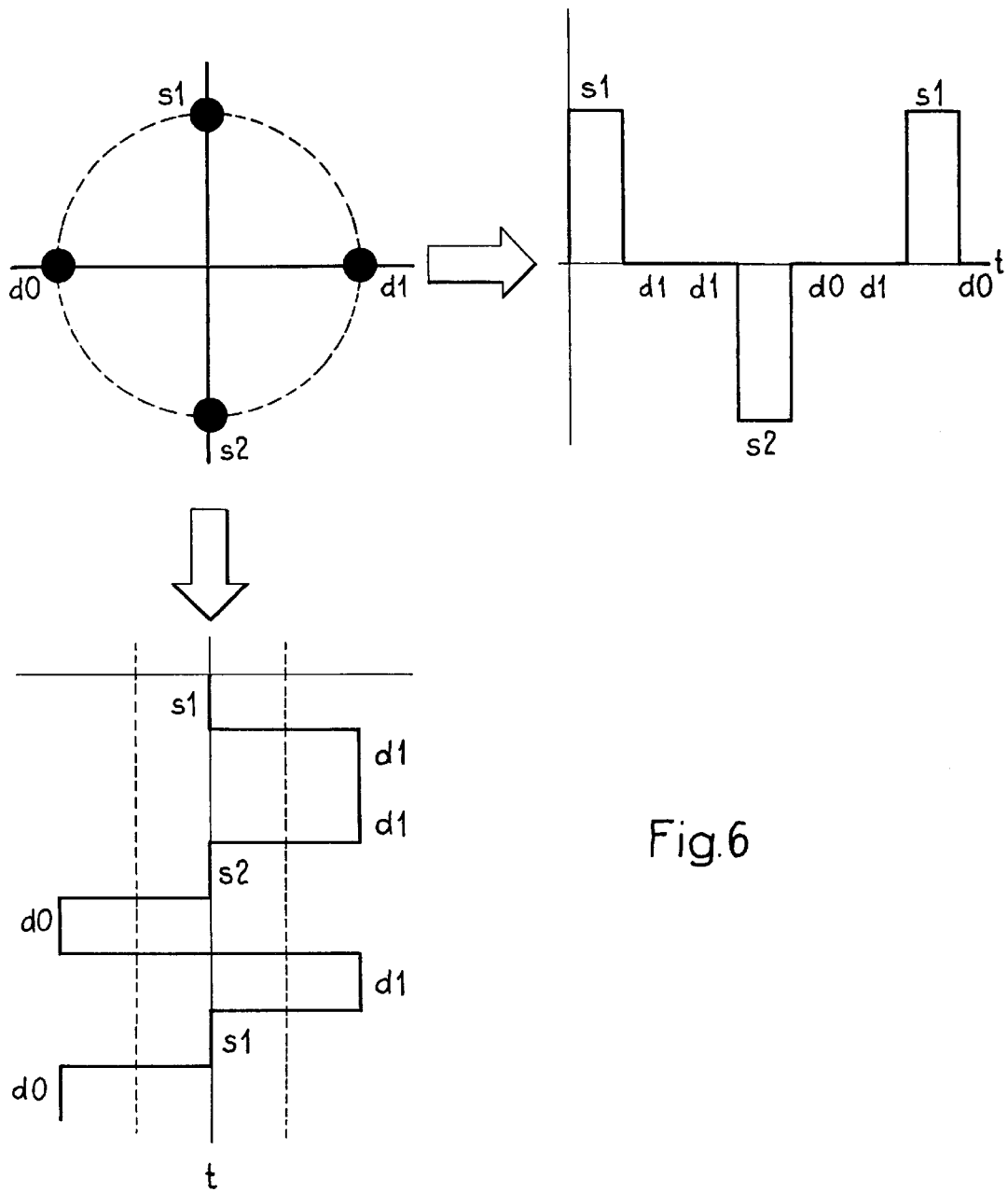
FIG. 6 is a schematic representation of an example of a signal in this case.

The corresponding voltage values of the signals d0, d0', S2', S1, S2, S1' d1', d1 are shown at the bottom of FIG. 5, and the lower threshold voltage L (FIG. 4), and higher threshold voltage H (FIG. 4) of the window discriminator 30 for the in-phase channel by means of dotted straight lines on the bottom in FIG. 6, and on the right for the quadrature channel. The received voltage is positive with >0 and negative with <0. The corresponding voltage values of the signals S1, d1, d1, S2, d0, d1, S1, d0 are represented on the right in FIG. 6.

Figure 7:
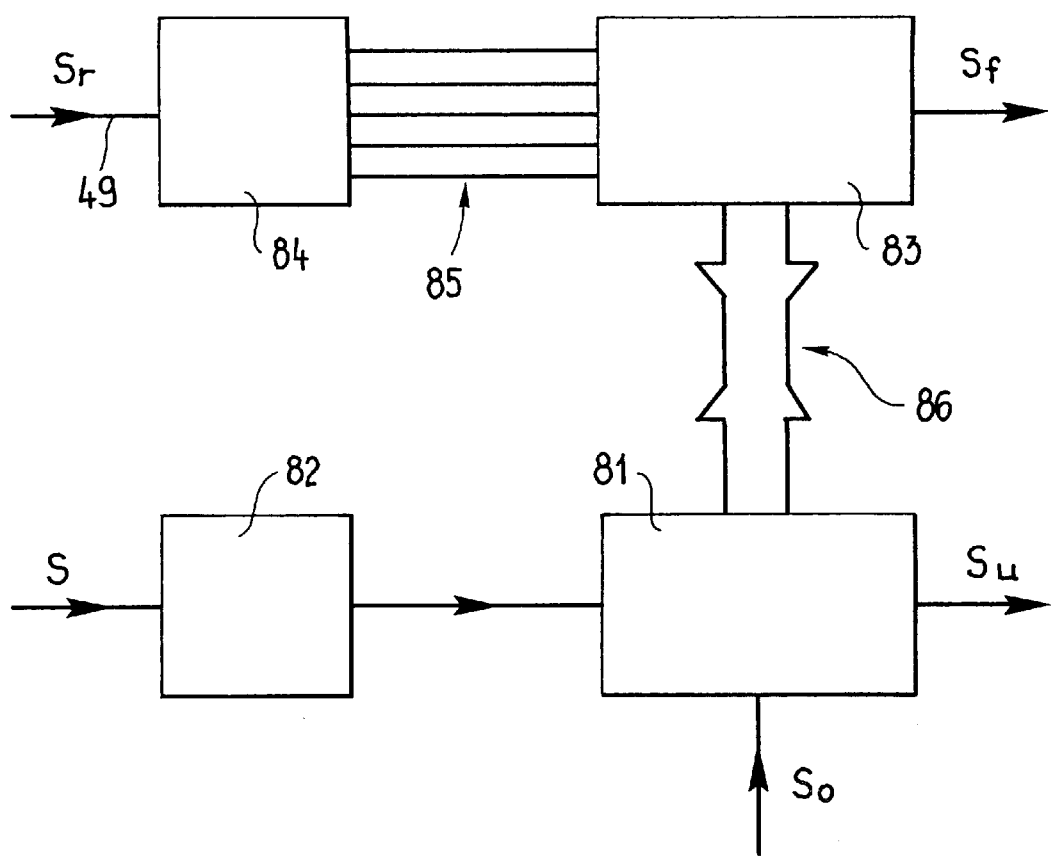
FIG. 7 is a schematic representation of a frequency acquisition circuit.

The frequency acquisition circuit 8 or 80 in accordance with FIG. 7 comprises a microprocessor 81, to which a detector 82 and a control circuit 83 are connected, and a filter bank 84. The microprocessor 81 is started at a start signal SO. The detector 82 connected to the electro-optical converter 12, or respectively 102 decides whether or not an actual signal S exists, and accordingly supplies a signal 1 or 0 to the microprocessor 81. The filter bank 84, which is provided with the output signal Sr from the feedback unit 4, or respectively 40, is conducted via a line 49 and can discriminate between a number n, for example up to 10, of frequency error ranges provides, via a bus or lines 85, appropriate discrimination signals to the control circuit 83, which is connected via a bus 86 with the microprocessor 81, which provides a control signal Su for the reversing switch 5, or respectively 50. The control circuit 83 itself supplies a signal Sf, which can be supplied to the local oscillator laser 7, or respectively 70, via the reversing switch 5, or respectively 50.

The frequency acquisition circuit 8 or 80 functions as follows:

The input signal SO first starts a rough frequency search run of the local oscillator laser 7, or respectively 70, which is then switched over by the frequency acquisition circuit 8, or respectively 80 via the reversing switch 5, or respectively 50, for control.

If, in a second method step, a signal S is detected at the input of the detector 82, i.e., if the local oscillator laser is now in the vicinity of the nominal frequency, the tuning speed is clearly reduced by the microprocessor 81 in order to start a fine search run.

In a third method step the frequency error, i.e. the signal Sr, is regulated to 0. In further embodiment of the invention, the signal Sr can also be conducted over the line 49 of the frequency acquisitions circuit 8, or respectively 80, to the evaluation device.

When finally the microprocessor 81 determines that frequency acquisition has been achieved, the frequency acquisition circuit 8, or respectively 80, is switched to normal operation, and from this moment on the local oscillator laser 7, or respectively 70, is now controlled via the loop filter 6, or respectively 60. The frequency acquisition is achieved, for example, when the signal Sr no longer oscillates.

The mentioned heterodyne receivers are miniaturized components, known per se (optical hybrid and balanced receivers). The frequency acquisition circuit 8, or respectively 80, causes the frequency fq of the unmodulated laser beam provided by the laser source to become controlled in order to achieve the agreement of this frequency fq with the frequency fe of the received modulated light beam. A phase regulation of the local laser source is performed by the window discriminator circuit, until locking of the phase has been achieved. Upon failure of the frequency synchronization, the reversing switch 5, or respectively 50, is again switched to the frequency acquisition circuit 8, or respectively 80. Once frequency synchronization has been achieved, the reversing switch again switches over to the window discriminator circuit.

Thus, the operation of the device in accordance with the invention is largely independent of the algorithm for the frequency acquisition used.

The employment of the window discriminator circuit, or respectively of the window comparator, for the homodyne reception of optical phase-keyed signals permits the determination of the phase of the optical carrier signal, and therefore the phase regulation of the local laser source.

The phase regulation makes use of orthogonal carrier states, which are either injected, or are already present per se, such as with the QPSK method (quadrature phase shift keying). Thus, in the device in accordance with the invention, the threshold value discriminator of the standard receiver is enlarged by two or more additional thresholds. The device can also be used with the QASK method (quadrature amplitude shift keying) or with the BPSK method (binary phase shift keying) with possible synchronization signals.

By means of the invention it was moreover learned that the connection 49 between the output of the feedback unit 4, or respectively 40, and the frequency acquisition circuit 8, or respectively 80, can also be omitted. It is preferably used when the tuning speed is large in comparison with the bandwidth of the optical control loop.

The modulated radiation received through the inputs 111, or respectively 131 can be circularly polarized. A change to a linearly polarized wave can be made with the aid of an upstream-connected plate. Additional means for regulating the polarization can be employed at the output of the local oscillator laser 7, or respectively 70.

The device in accordance with the invention is excellently distinguished by large long-time stability. Moreover it can be carried out with little elaboration.

The exemplary embodiments shown above should merely be understood as a representation of the application of such a device. Other embodiments immediately resulting from this for one skilled in the art also contain the basic idea of the invention.

What is claimed is:

1. A device for the homodyne reception of optically phase-keyed signals of preselected frequency comprising:
    a first heterodyne receiver having an input for receiving the optically phase-keyed signal of the preselected frequency and an output;
    a first data discriminator having an in-phase channel for receiving the optically phase-keyed signal of the preselected frequency and having an a data signal output;
    a frequency acquisition circuit for tuning to the preselected frequency of the optically phase-keyed signal at the output of the dated discriminator;
    a local oscillator laser for generating an optical signal at the preselected frequency having a phase matched to the optically phase-keyed signal received at the first heterodyne receiver;
    a feedback unit for an optical phase-locked loop having multiple inputs and an output, at least one of said feedback unit inputs connected with the output of said first data discriminator;
    a window discriminator having two or more thresholds inserted between the output of said first heterodyne receiver and another input of said feedback unit;
    a reversing switch for supplying a control input of said local oscillator laser with an output signal selected from at least one of a group consisting of an output signal of said feedback unit or an output signal of said frequency acquisitions circuit;
    a filter circuit connected with said reversing switch;
    a second heterodyne receiver having an input from the first heterodyne receiver, an input from the local oscillator laser and an output;
    a second data discriminator for a quadrature channel having a data signal output and an output wherein the output of said second data discriminator is connected to an input of said feedback unit; and,
    a first optical beam splitter connected to receive the optically phase keyed signal of preselected frequency with output to the first heterodyne receiver and an output to the second heterodyne receiver;
    a second optical beam splitter connected to receive an input from the local oscillator laser and with output to the first heterodyne receiver and the second heterodyne receiver;
    whereby a phase keyed comparison can occur between the data signal output of the first data discriminator and the data signal output of the second data discriminator for decoding the optically phase keyed signal at the selected frequency.

2. The device in accordance with claim 1 and wherein the frequency acquisition circuit comprises:
    the filter circuit is connected to the input of the reversing switch.

3. The device in accordance with claim 1 and wherein the frequency acquisition circuit comprises:
    the filter circuit is connected to the output of the reversing switch.

4. The device in accordance with claim 1 and wherein the frequency acquisition circuit comprises:
    a microprocessor having an output which supplies a control signal for the reversing switch into which a detector and a control circuit are connected;
    the detector designed for detecting whether an actual signal is present at the output of an electro-optical converter of the homodyne receiver, and for providing a control signal for the microprocessor accordingly; and,
    the control circuit is designed for supplying a control signal conducted via the reversing switch for the local oscillator laser.

5. The device in accordance with claim 1 and wherein:
    the frequency acquisition circuit comprises a filter bank having an input connected with the output of the feedback unit, the filter bank arranged to discriminate between at least two frequencies in order to provide appropriate discrimination signals to the control circuit.

6. A device for the homodyne reception of optically phase-keyed signals comprising:

a first heterodyne receiver having an input and an output;

a first data discriminator for an in-phase channel having an output;

a local oscillator laser;

a feedback unit for an optical phase-locked loop having multiple inputs and an output, at least one of said feedback unit inputs connected with the output of said first data discriminator;

a frequency acquisition circuit comprises a filter bank having an input connected with the output of the feedback unit;

a window discriminator having two or more thresholds inserted between the output of said heterodyne receiver and another input of said feedback unit;

a reversing switch for supplying a control input of said local oscillator laser with an output signal selected from at least one of a group consisting of an output signal of said feedback unit or an output signal of said frequency acquisitions circuit;

a filter circuit connected with said reversing switch;

a microprocessor having an output which supplies a control signal for the reversing switch into which a detector and a control circuit are connected;

the detector designed for detecting whether an actual signal is present at the output of an electro-optical converter of the homodyne receiver, and for providing a control signal for the microprocessor accordingly;

the control circuit is designed for supplying a control signal conducted via the reversing switch for the local oscillator laser;

a second heterodyne receiver having an input and an output;

a second data discriminator for a quadrature channel having an output wherein the output of said second data discriminator is connected to an input of said feedback unit; and, two optical beam splitters;

wherein the beam splitters are connected to the two heterodyne receivers and the output of the local oscillator laser is connected with the input of one of these beam splitters.

* * * * *